US010506395B2

(12) United States Patent
Bergek et al.

(10) Patent No.: US 10,506,395 B2
(45) Date of Patent: Dec. 10, 2019

(54) METHOD AND SYSTEM FOR DYNAMIC SELECTION OF COMMUNICATION PATHS FOR A MOVING VEHICLE

(71) Applicant: ICOMERA AB, Göteborg (SE)

(72) Inventors: Martin Bergek, Askim (SE); Mats Karlsson, Göteborg (SE); Peter Eklund, Göteborg (SE)

(73) Assignee: ICOMERA AB, Göteborg (SE)

( * ) Notice: Subject to any disclaimer, the term of this patent is extended or adjusted under 35 U.S.C. 154(b) by 0 days.

(21) Appl. No.: 15/363,271

(22) Filed: Nov. 29, 2016

(65) Prior Publication Data
US 2017/0163720 A1 Jun. 8, 2017

(30) Foreign Application Priority Data

Dec. 4, 2015 (SE) ........................................ 1551595

(51) Int. Cl.
*H04W 4/42* (2018.01)
*H04W 24/02* (2009.01)
(Continued)

(52) U.S. Cl.
CPC ................ *H04W 4/42* (2018.02); *H04B 7/15* (2013.01); *H04L 12/2858* (2013.01);
(Continued)

(58) Field of Classification Search
CPC .............. H04B 1/082–088; H04B 7/15; H04L 12/2858–2898;
(Continued)

(56) References Cited

U.S. PATENT DOCUMENTS

| 2003/0223395 A1 | 12/2003 | Chitrapu |
| 2014/0040442 A1 | 2/2014 | Saavedra |

(Continued)

FOREIGN PATENT DOCUMENTS

| EP | 1 175 757 B1 | 1/2005 |
| EP | 2 943 011 A1 | 11/2015 |

(Continued)

OTHER PUBLICATIONS

Extended European Search Report dated May 22, 2017, issued by the European Patent Office in corresponding European Application No. EP 16198927.2. (4 pages).

(Continued)

*Primary Examiner* — Timothy J Weidner
(74) *Attorney, Agent, or Firm* — Buchanan Ingersoll & Rooney P.C.

(57) ABSTRACT

A method for wireless communication between a moving vehicle and remote servers through at least one external mobile network. A router in the moving vehicle is configured for receiving and transmitting wireless data to and from both an aggregation server, using aggregated communication over at least two separate links, and at least one other stationary communication server, using non-aggregated communication over a single link. The router is further accessible by a plurality of client devices onboard the moving vehicle. At least one selection rule is provided in the router for selecting whether to use aggregated or non-aggregated communication, and a determination is made, upon a request from a client device to communicate with one of said remote servers, whether one of the at least one rules applies; and if so selecting to use aggregated communication via the at least one other communication server for communication based on the determination.

16 Claims, 2 Drawing Sheets

(51) Int. Cl.

| | | |
|---|---|---|
| *H04W 28/02* | (2009.01) | |
| *H04W 28/08* | (2009.01) | |
| *H04W 40/02* | (2009.01) | |
| *H04W 40/22* | (2009.01) | |
| *H04W 48/06* | (2009.01) | |
| *H04W 76/15* | (2018.01) | |
| *H04W 84/00* | (2009.01) | |
| *H04W 88/00* | (2009.01) | |
| *H04W 88/16* | (2009.01) | |
| *H04W 92/04* | (2009.01) | |
| *H04L 29/08* | (2006.01) | |
| *H04L 29/06* | (2006.01) | |
| *H04L 12/911* | (2013.01) | |
| *H04L 12/803* | (2013.01) | |
| *H04L 12/40* | (2006.01) | |
| *H04L 12/28* | (2006.01) | |
| *H04L 12/24* | (2006.01) | |
| *H04B 7/15* | (2006.01) | |

(52) U.S. Cl.
CPC ...... *H04L 12/2865* (2013.01); *H04L 12/2867* (2013.01); *H04L 41/0896* (2013.01); *H04L 47/125* (2013.01); *H04L 47/78* (2013.01); *H04L 67/1004* (2013.01); *H04L 67/12* (2013.01); *H04L 69/14* (2013.01); *H04L 69/26* (2013.01); *H04W 24/02* (2013.01); *H04W 28/0247* (2013.01); *H04W 28/085* (2013.01); *H04W 40/02* (2013.01); *H04W 40/22* (2013.01); *H04W 48/06* (2013.01); *H04W 76/15* (2018.02); *H04L 2012/40293* (2013.01); *H04W 84/005* (2013.01); *H04W 88/005* (2013.01); *H04W 88/16* (2013.01); *H04W 92/04* (2013.01)

(58) Field of Classification Search
CPC ............. H04L 2012/40208–40293; H04L 41/08–0896; H04L 43/02–50; H04L 47/12–26; H04L 47/70–829; H04L 49/20–258; H04L 49/35–90; H04L 65/10–1063; H04L 67/10–1038; H04L 67/12–42; H04L 69/14; H04L 69/18; H04L 69/26; H04W 4/02–029; H04W 4/04–046; H04W 4/40–48; H04W 16/02–225; H04W 24/02–10; H04W 28/0226–0273; H04W 28/06–26; H04W 36/14–385; H04W 40/02–22; H04W 48/02–20; H04W 76/15–16; H04W 84/005; H04W 88/005; H04W 88/16; H04W 92/04; H04W 92/06; H04W 92/10
See application file for complete search history.

(56) References Cited

U.S. PATENT DOCUMENTS

| | | |
|---|---|---|
| 2014/0146749 A1 | 5/2014 | Barker et al. |
| 2015/0215738 A1* | 7/2015 | Frusina ............... H04W 4/023 455/426.1 |
| 2016/0119163 A1* | 4/2016 | Fadeev ............... H04L 12/6418 370/328 |
| 2017/0078729 A1* | 3/2017 | Karlsson ............... H04L 67/12 725/75 |

FOREIGN PATENT DOCUMENTS

| | | |
|---|---|---|
| GB | 2 422 272 A | 7/2006 |
| WO | WO 00/67435 A1 | 11/2000 |

OTHER PUBLICATIONS

Office Action (Notice (4 Months)) dated Apr. 7, 2017, by the Swedish Patent and Registration Office in Swedish Patent Application No. 1551595-0. (8 pages).

Song, et al., "Hybrid Coupling Scheme for UMTS and Wiretess LAN Internetworking", Vehicular Technology Conference, VTC 2003—Fall. 2003 IEEE 58th Ortando, FL. USA Oct. 6-9, 2003, vol. 4, pp. 2247-2251.

Swedish Office Action issued Jun. 20, 2016, by the Swedish Patent Office in corresponding Patent Application No. 1551595-0.

* cited by examiner

METHOD AND SYSTEM FOR DYNAMIC SELECTION OF COMMUNICATION PATHS FOR A MOVING VEHICLE

TECHNICAL FIELD OF THE INVENTION

The present invention relates to a method and system for wireless communication between a moving vehicle, and in particular a train, and remote servers through at least one external mobile network.

BACKGROUND

There is an increasing demand from e.g. train passengers to be able to communicate through mobile phones and other hand-held terminals while traveling, and also to access the Internet with laptop computers etc. However, train carriages are made of metal, and even the windows are normally covered with a metal film. Accordingly, train carriages are shielded compartments, and direct communication between terminal antennas within the carriages and externally located antennas is difficult to obtain. Further, with continuously operating software applications on ubiquitous hand-held devices, large numbers of cellular network hand-overs are required when the train moves. Even though this problem is common for all moving vehicles, it is especially pronounced for vehicles moving at high speed with many passengers, such as trains. This puts a strain on the wireless network infrastructure, leading to poor performance.

The mobile nature of a client with respect to the base stations may also introduce several potential sources of communication performance degradation. Such sources may derive from complex terrain, competition for available channels, or the source may be an unknown source of noise related to e.g. radio-frequency interference.

To this end, train carriages are often provided with an external antenna connected to a repeater unit within the carriage, which in turn is connected to an internal antenna. Hence, the communication between the passengers' terminals and the operator antennas outside the trains occurs through the repeater unit. Similarly, it is known to provide a mobile access router for data communication, also connected both to an external antenna and an internal antenna, in each carriage, in order to provide Internet access on board the train. Such mobile access router solutions are e.g. commercially available from the applicant of the present application, Icomera AB, of Gothenburg, Sweden, and are also disclosed in EP 1 175 757 by the same applicant. This method, hereinafter referred to as "aggregation", has greatly improved the reliability of high-bandwidth wireless communication for trains and other large vehicles. However, this solution may still be insufficient to obtain an optimal transmission performance, especially for large data volumes. Trains and other moving vehicles often pass through areas with bad radio coverage, and present solutions are often unable to handle the required traffic.

Further, e.g. the current rising trend of streaming media uses far more data per minute of journey per passenger than older uses of the Internet, such as browsing text- and image-based sites like Facebook, or checking and responding to email.

Routing all traffic from a vehicle to a gateway, an aggregation server, also puts a strain on the gateway. The performance of that gateway is a natural bottleneck in the system when the data volume increases. Each train may have more than one router, and even if each router may have its own gateway, if multiple gateways are co-located at the same physical site, the wired network infrastructure of that site is still a potential limiting factor. With the continuing popularization, utilization and improvement of wireless Internet communication, it will soon be economically infeasible to maintain numerous stationary gateways with terabit bandwidth or more to serve large fleets of vehicles using LTE-A or similar, more sophisticated technologies.

There is therefore a need for an improved method and system for communicating with clients on moving vehicles, and in particular trains, allowing increased capacity, capacity utilization, quality and/or cost-efficiency. Even though the above discussion is focused on trains, similar situations and problems are encountered in many other types of moving vehicles, and in particular moving passenger vehicles, such as buses, ships and airplanes.

SUMMARY OF THE INVENTION

It is therefore an object of the present invention to provide a wireless communication method and system for moving vehicles which alleviates all or at least some of the above-discussed drawbacks of the presently known systems. In particular, it is an object of the present invention to provide a method and system which retain the advantages of aggregation for specific applications, where these advantages are most needed, while alleviating the tendency for a bottleneck to form, mitigating the effects of a bottleneck, and ultimately providing a fallback mechanism in the event that a gateway becomes unreachable.

This object is achieved by means of a wireless communication method and system for a moving vehicle, and in particular a train, as defined in the appended claims.

According to a first aspect of the invention, there is provided a method for wireless communication between a moving vehicle and remote servers through at least one external mobile network, wherein at least one router provided in the moving vehicle is configured for receiving and transmitting wireless data to and from both an aggregation server, using aggregated communication over at least two separate links, and at least one other stationary communication server, using non-aggregated communication over a single link, and the router further being accessible by a plurality of client devices onboard said moving vehicle, the method comprising:

providing at least one selection rule in said router for selecting whether to use aggregated or non-aggregated communication;

determining, upon a request from a client device to communicate with one of said remote servers, whether one of said at least one rules applies; and selecting to use aggregated communication via said aggregation server or non-aggregated communication via said at least one other communication server for communication based on said determination.

Thus, there is provided a method for selecting which wireless computer network traffic is to be aggregated in the process of routing said traffic between a moving vehicle and stationary servers. It is determined, upon a request from a client device to access a resource on a remote server, whether that request should use aggregation. When aggregation should be used, routing of the request occurs through a specific stationary server—the aggregation server—whereas where aggregation should not be used, an "ordinary" wireless link is selected. Hereby, such non-aggregated traffic is conveyed more directly to its target server by routing it over the single link selected for this purpose.

The invention is based on the realization that only most data streams are very short, whereas some data streams, such as voice over IP (VoIP) streams are long. Aggregation provides great advantages in respect of maintaining streams over a long period of time. The need for aggregation and ensuring that the streams are maintained are of great importance for such long streams, whereas this is of less need for shorter streams. For example, downloading an ordinary web page is typically made by downloading a plurality of separate streams. Should one of these streams fail, re-sending of that stream would be easily handled. However, should a VoIP stream be disrupted, the call would be aborted. Thus, by using aggregation for only certain streams, the overall performance of the communication system is greatly improved. Further, by using the aggregated communication only for certain streams, being in best need of the this performance, the capacity of this communication route is better used, and saved for the streams where it is of the best advantage.

The "router" is a networking router, which is a machine that forwards data packets between computer networks, on at least one data link in each direction. The router may be a mobile access router, and preferably a mobile access and applications router.

Each stationary server may be any server or site accessible through the exterior mobile network, such as a DNS server, an ISP infrastructure gateway, an aggregation gateway, a content provider server of interest to vehicle passengers, or the like. For all common applications of this invention, the stationary servers will constitute the Internet, but partly or purely private network applications are also feasible.

The router and the stationary servers are preferably connected through a plurality of exterior mobile networks, which are simultaneously usable. Also, the router is preferably arranged to communicate with stationary servers on at least two different data links (communication routes) having different characteristics. These characteristics may include packet loss (intermittent failure for packets of data to arrive), latency (round-trip response time, hence responsiveness), throughput (overall rate of data transmission, whether current or potential) and a variety of radiophysical metrics, such as signal strength. Said characteristics are measured by the router.

Such a method for aggregated communication is disclosed in EP 1 175 757, by the same applicant, said document hereby being incorporated by reference. It describes a method of stabilizing the connection between a moving vehicle and the Internet by means of a router and gateway. Multiple wireless links on the vehicle are aggregated for simultaneous use by means of routing all traffic on said links through a shared virtual connection to and from the gateway, which is a stationary computer acting as a server—an aggregation server—on the Internet. This method, hereinafter referred to as "aggregation", has greatly improved the reliability of high-bandwidth wireless communication for trains and other large vehicles. However, routing all traffic from a vehicle to a gateway puts a strain on the gateway, hereinafter also referred to as the "aggregation server". The multiple wireless links on the vehicle can use a variety of different types of infrastructure and different ISPs (Internet service providers) with sophisticated load-balancing schemes, but as long as all traffic ultimately passes through a single gateway, the performance of that gateway is a natural bottleneck in the system. Each train may have more than one router, and each router may have its own gateway, but if multiple gateways are co-located at the same physical site, the wired network infrastructure of that site is still a potential limiting factor. A current wireless communication technology known as LTE Advanced (LTE-A) is likely to give one train a bandwidth around 1 Gb/s. With the continuing popularization, utilization and improvement of wireless Internet communication, it will soon be economically infeasible to maintain numerous stationary gateways with terabit bandwidth to serve large fleets of vehicles using LTE-A or similar, more sophisticated technologies.

The present invention provides a solution in which all the benefits and advantages of the aggregated communication are maintained, but in addition solves the bottleneck problem and other problems experienced or anticipated with this known system. Thus, the present invention provides great advantages in bandwidth and other communication properties, lower the costs, and provides increased robustness.

The router may use any available data links, such as two or more of e.g. satellite, DVB-T, HSPA, EDGE, 1×RTT, EVDO, LTE, LTE-A, Wi-Fi (802.11) and WiMAX. The present invention requires that the router be capable of aggregating said links into one virtual network connection, in such a way that traffic can be sent either through that virtual connection or outside it, through any of the individual links.

Aggregation is the state and process whereby data streams between on-board clients and external stationary servers are jointly managed, preferably by a special protocol, between the router and the aggregation gateway/aggregation server. In reality, aggregated traffic passes through ISP infrastructure servers on its way to and from the aggregation gateway, but the virtual connection makes it appear to a third party, such as a web site, that all communications are taking place between that site and the aggregation gateway. This is advantageous because the aggregation gateway has a single, stable IP address and because streams of data can be moved from one physical link to another with minimal disruption, since the various links can be monitored both from the router and from the gateway.

Aggregation can but does not necessarily exhaust the potential throughput of a link. The use of a link for aggregation does not preclude the simultaneous use of that link for other purposes. Of particular interest in the present invention is the ability to adapt to a variety of situations by using links wholly with, wholly without, or partially with and partially without aggregation.

The use of multiple parallel wireless links without aggregation, for non-aggregated communication, can be done by standards and common practices of IP networking. For example, a simple approach would be for the router to continuously loop over its connected links, assigning each request from a client on board to the link least recently given such an assignment. This is known as "round robin" routing. The selected link would convey the client's request to the target server and convey any response from the target server back to the router, which conveys said response back to the original client. From the point of view of the target server, it would appear to be communicating with the IP address of the selected link. The aggregation gateway would have no part in this communication whatsoever. The next request from any client would be handled by a different link and would therefore use a different IP address.

For a deeper discussion of selective routing, "data streams" are hereinafter defined as all communication with a specific combination of ultimate source and ultimate destination IP addresses and network ports, or whatever the equivalent of this would be in a networking scheme where these identifiers are not used or not sufficiently distinguishing. Such a stream is created when any entity on one side of the system seeks to communicate with any entity on the other side, using any specific combination of ports. A stream is deemed terminated after a period of inactivity which need not be closely defined, but will typically correspond to the session-ending 15-second timeout in the transmission control protocol (TCP). Renewed activity after termination, even if the source and destination are unchanged, constitutes a new stream for the purposes of this discussion.

By means of the present invention, each data stream can be analyzed and selected to be routed with aggregation or without aggregation based on the properties of each stream and on the availability of the aggregation gateway, in such a way as to optimize the load on the aggregation gateway's resources while also enabling the router to function in situations where the aggregation gateway cannot or should not be used at all. To this end, the router preferably has some information on the likely load on its aggregation gateway, either obtained directly, by communication with the gateway, or indirectly, by means of router configuration details which describe specific rules on what kind of streams to aggregate, what not to aggregate, or both.

In the event that a router observes its aggregation gateway to be entirely unreachable, or equivalently in the event that the gateway is too busy to provide adequate performance, the router may fall back to another aggregation gateway. In an embodiment of the present invention, the router may, after having failed in its search for a functioning gateway, cease to aggregate traffic entirely until an adequate gateway connection has been established. This will cause the router to provide inferior performance, but it does enable the continued use of multiple concurrent links.

When an aggregation gateway is available, data streams will be selected for aggregation based primarily on the differing benefits of aggregating different types of traffic. The present invention is based on the realization that these needs for different types of traffic varies greatly, and by treating such traffic differently, great savings and much increased performance can be obtained. For example, an individual HTTP request made from a client browsing the web is likely to be brief, and one client's HTTP-based interaction with one web site is likely, but not guaranteed, to be unaffected by changes in the client's apparent public address from one individual request to another. Furthermore, HTTP traffic constitutes a large portion of passenger traffic. Therefore, excluding all HTTP requests from aggregation saves a relatively large amount of gateway load, while generally costing little in perceived performance. At the other end of the spectrum, a VPN connection is likely to be lengthy and sensitive to perturbations, such as changes in apparent IP address due to periods of poor coverage on one link or another. VPN connection data streams would therefore be among the last types of streams to be excluded from aggregation. They can be said to have a high need for aggregation, by virtue of the relative benefits they derive from aggregation.

The automatic analysis of data streams, for the purpose of categorization by need for aggregation, can take place by a variety of means, as discussed below. The subsequent or simultaneous selection of categorized streams to be aggregated will take place by rules akin to or identical to firewall rules. This can be arranged into a system such that categorization is numeric and directly comparable to the overall capacity for aggregation, with the effect that the level of aggregation performed can be adjusted in real time based on the measured gateway load and the volume of traffic at each level of need.

According to one embodiment of the present invention, the at least one selection rule comprises a dynamic adjustment to current load on the aggregation server. Particularly, the load on the aggregation server may be estimated based on information received by direct communication with the aggregation server or indirectly, based on router configurations.

The at least one selection rule may comprise determining whether the requested resource involves a HTTP communication, and if so to assign non-aggregated communication for this communication. Additionally or alternatively, the at least one selection rule may comprise determining whether the requested resource involves a TCP communication a destination port of 80, and if so to assign non-aggregated communication for this communication. Additionally or alternatively, the at least one selection rule may comprise determining whether the requested resource involves a VPN communication, and is so to assign an aggregated communication for this communication.

Preferably, the at least one selection rule comprises determining the data stream type related to the requested resource, and assigning aggregated communication to data stream types of predetermined data stream types. The predetermined data stream types are preferably at least one of voice-over-IP (VOIP) and VPN. The data stream type may be determined based on deep packet inspection.

The router is preferably configured for receiving and transmitting wireless data to and from at least two stationary communication servers using non-aggregated communication, each over a single link, and wherein non-aggregated communication is assigned to said stationary communication server links based on a round-robin protocol.

When it is determined that there is a high load on the aggregation server, communication normally assigned to aggregated communication is preferably instead assigned to non-aggregated communication.

The router may further be configured for receiving and transmitting wireless data to and from at least two stationary communication servers using non-aggregated communication, each over a single link, and wherein the communication normally assigned to aggregated communication is assigned to non-aggregated communication links having the best characteristics.

The present invention is particularly useable and highly advantageous on trains, but may also be used on other moving vehicles, and in particular moving passenger vehicles, such as ferries, buses, airplanes, etc.

According to another aspect of the invention, there is provided a wireless communication system for a moving vehicle, comprising:

at least one router in the moving vehicle for communication with remote servers through at least one external mobile network, wherein the router is configured for receiving and transmitting wireless data to and from both an aggregation server, using aggregated communication over at least two separate links, and at least one other stationary communication server, using non-aggregated communication over a single link, and the router further being accessible by a plurality of client devices onboard said moving vehicle;

a controller within or connected to said router, said controller including at least one selection rule for selecting whether to use aggregated or non-aggregated communication, the controller being configured to determine, upon a request from a client device to communicate with one of said remote servers, whether one of said at least one rules applies, and to select using aggregated communication via said aggregation server or non-aggregated communication via said at least one other communication server for communication based on said determination.

With this aspect of the invention, similar advantages and preferred features are present as in the previously discussed first aspect of the invention.

The router and the aggregation server are preferably connected through a plurality of exterior mobile networks, which are simultaneously useable. Further, the router is preferably arranged to communicate with the aggregation server on at least two different communication routes having different characteristics, and to automatically separate the communication traffic between said communication routes based on specific optimization conditions, such as price, latency and/or speed.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles, such as buses, ferries, airplanes and the like.

Figure 1:
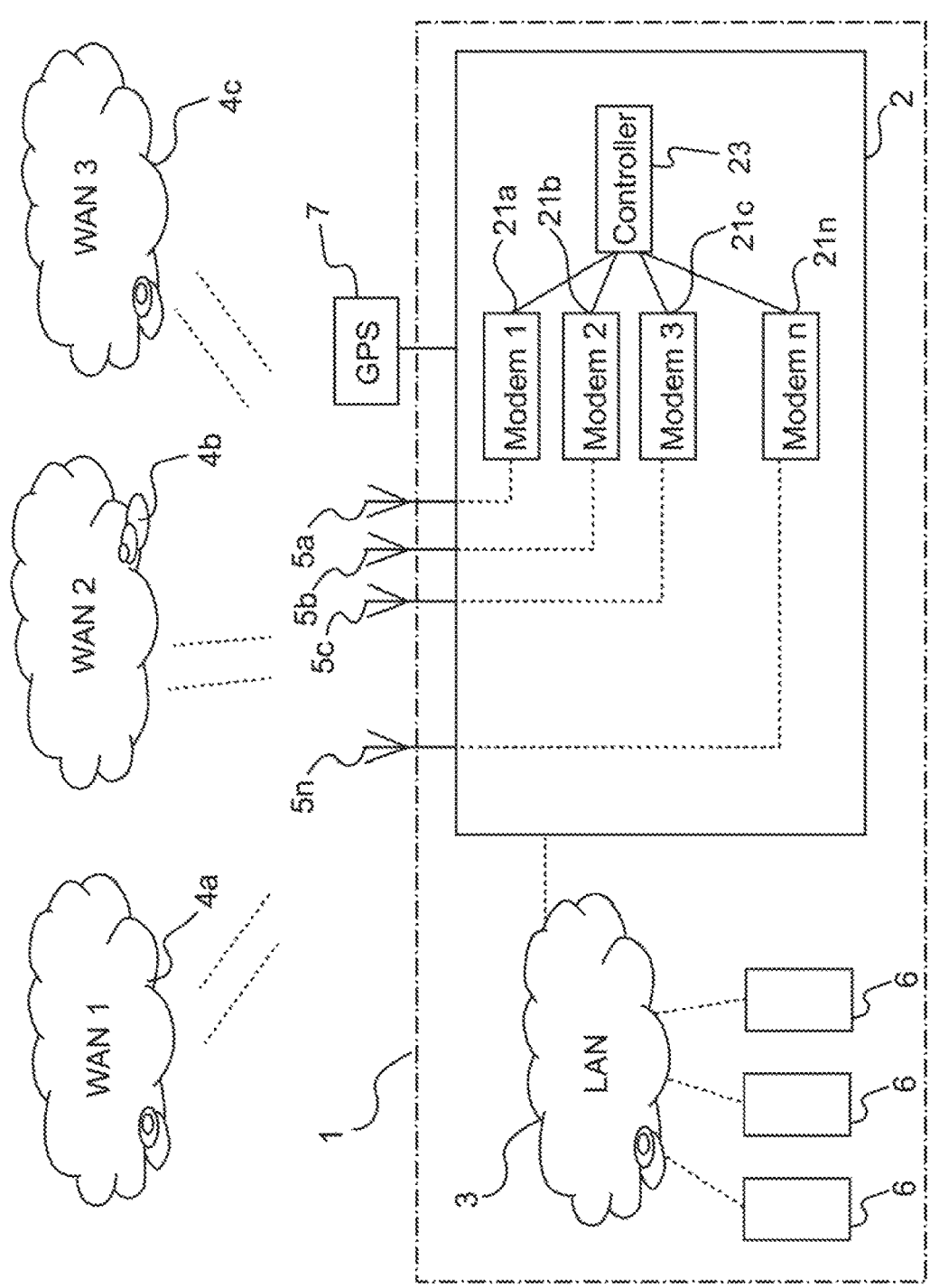
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Communication to and from the WANs is provided through one or several antennas 5 a-n on the vehicle roof. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobile telephones, smart phones, PDAs and so on.

The data communication router comprises a plurality of modems 21a-n. Assignment of data streams to different WANs and/or to different data links on one WAN is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the vehicle, and wherein the controller may be arranged to assign data streams to various data links also partly in dependence on said received GPS signals.

The data communication router may also be denominated MAR (Mobile Access Router) or MAAR (Mobile Access and Applications Router).

The data communication router is preferably arranged to communicate on at least two different communication routes having different characteristics. Hereby, the communication can be automatically optimized based on specific conditions, such as price, speed, etc. Such data communication routers are e.g. known from EP 1 175 757 by the same applicant, said document hereby incorporated by reference. Such routers are also commercially available from the applicant, Icomera AB. Hereby, the router may use all available data channels, such as two or more of e.g. Satellite, DVB-T, HSPA, EDGE, 1×RTT, EVDO, LTE, LTE-A, WiFi (802.11), Ethernet and WiMAX; and combine them into one virtual network connection. An automatic selection may be made among the available channels to use the most cost effective combination that fulfils the users' availability, bandwidth and reliability requirements. Hence, a seamless distribution of the data among said different channels can be obtained.

Figure 2:
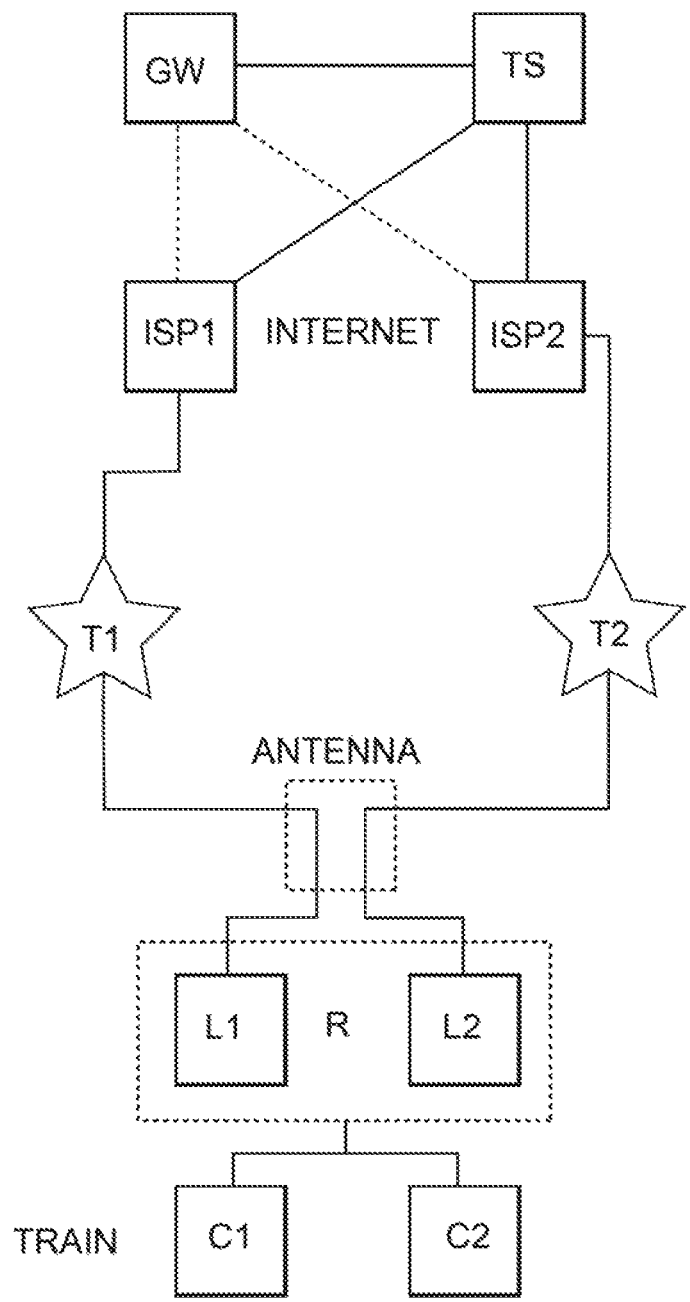
FIG. 2 is a more detailed block diagram of the wireless communication system of FIG. 1.

A more detailed embodiment of the communication system is illustrated in FIG. 2. This figure provides a schematic overview of a simple embodiment of the present invention. Here, an exemplary system is illustrated, comprising a train (TRAIN) containing a router (R) with two modems as links (L1, L2), an antenna array (ANTENNA) and two nearby radio towers (T1, T2) as well as several servers on the Internet: Internet service provider infrastructure sites (ISP1, ISP2), an aggregation gateway/aggregation server (GW) and a target site/remote server (TS) for on-board client device (C1, C2) communications. For simplicity, FIG. 2 shows the simplest embodiment that may be used to illustrate the invention. However, it should be appreciated by the skilled addressee that many more communication links, stationary servers, gateways, antennas, etc. may be used in analogy with this simplified embodiment.

In the embodiment of FIG. 2 the train comprises a router. The router has two links, each connected to a different ISP. From the ISP sites, it is possible to reach target site TS.

We will now consider a variety of scenarios differing only in the reachability of the aggregation gateway GW, indicated by dashed lines in the diagram.

In scenario I, the aggregation gateway GW is reachable and idle, such as being under 0-20% load. In this scenario, it is economically efficient for the router to construct a virtual connection to GW and assign all traffic from C1 and C2 to the virtual connection. In reality, traffic through the virtual connection passes through either ISP1 or ISP2, and GW, on its way to and from TS. This creates a load on GW, including a load on overall site bandwidth as well as server CPU etc.

In scenario II, GW is reachable but under some load, such as being under 20-70% load, or 30-60% load, such as under 40% load, from other routers. The virtual connection can still be created and will be stable.

In scenario III, GW is reachable but under heavy load, such as under 60-99% load, or 80-99% load, such as 95% load. The virtual connection may be intermittent as a result of CPU bottlenecks or network congestion at the gateway site.

In scenario IV, GW is not responding, e.g. due to overload (100% load), or being subject to power breakdown, having been hacked by a hostile agent, or for other reasons being permanently or temporarily unreachable. Here, there will be no virtual connection.

In one possible embodiment of the present invention, the router R is configured to aggregate all client traffic except TCP traffic with a destination port of 80. The router has a firewall rule carrying out the analysis of client traffic to identify all such packets. This is an attractive solution because the firewall rule produces very little overhead. Round-robin routing of the unaggregated traffic, where L1 and L2 take turns handling each new data stream, is also cheap in terms of CPU cycles. In the example of a Linux-based router, round robin can be achieved using a "nexthop" function in the operating system kernel. However, not all TCP traffic on port 80 is actually HTTP traffic, and some HTTP traffic, such as large file downloads, stands to benefit from aggregation, so the simplicity of this embodiment does come with some drawbacks. Round-robin routing may also, in some situations, lead to poor performance if the streams assigned to L1 turn out to be much larger than those assigned to L2, or if L1 is a UMTS link whereas L2 is an LTE-A link with many times more bandwidth available. There would be underutilized bandwidth on L2 in either of those cases. The aggregated traffic could be placed more intelligently to compensate, as is per se known. In any case, this simplistic embodiment alleviates the load on the gateway in scenarios I and II, without degrading performance too badly.

In a more preferable embodiment, the router runs packet inspection software or talks to an external packet sniffer to analyze client traffic on a deeper level, purely for the purpose of aggregation triage. Packet inspection would make it possible to identify a variety of traffic types in need of aggregation or other special treatment such as the aforementioned VPN tunnels or voice-over-IP (VOIP) connections. VOIP, conveying the human voice in real time, is sensitive to latency and should therefore be routed with special consideration for latency, such as can more easily be obtained with aggregation than without it. With such an embodiment, it would be possible to aggregate only those types of traffic in particular need of aggregation, and route everything else away from GW by default. This would greatly alleviate the load on GW, ideally to the point of allowing the virtual connection to remain useful for special needs in scenario III.

A variety of routing schemes for unaggregated traffic can be used in an embodiment of this invention. The various link characteristics measurable by the router can be taken into account in such routing schemes. For example, in scenario IV, VOIP cannot be aggregated, but it would still be possible to analyze the available links so that VOIP traffic is routed, unaggregated, over whichever link has the lower (i.e. better) latency value. In general, the traffic most in need of aggregation would have preferential treatment in scenario IV, being assigned to links with better characteristics, while other traffic is assigned to inferior links.

In a preferred embodiment of this invention, the router R adjusts which types of traffic are aggregated depending on the circumstances. In scenario I, for example, the router would aggregate everything, while in scenario II it would cease to aggregate the downloading of ordinary web pages and images from TS, as detected by relatively simple HTTP header inspection. In scenario III the router would aggregate only the most needful data streams using deep packet inspection, and finally, in scenario IV, the router would aggregate nothing, instead routing all traffic, including DNS lookups, directly onto the links until a gateway connection can be reestablished. This embodiment would make the router highly responsive and resilient, but less predictable than the alternative embodiments discussed above.

The invention has now been described with reference to specific embodiments. However, several variations of the communication system are feasible. For example, any number of parallel links may be used, both for the aggregated communication and the non-aggregated communication. Further, the control unit may be integrated with the router, and e.g. be realized by software within the controller of the router, or be arranged as one or several separate unit(s) connected to the router. Further, the communication system may be used on various types of vehicles. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A method for wireless communication between a moving vehicle and remote servers through at least one external mobile network, the method comprising:

providing at least one router in the moving vehicle configured for receiving and transmitting wireless data to and from both an aggregation server, using aggregated communication over at least two separate links, thereby forming a single virtual connection between the at least one router and the aggregation server, and at least one other stationary communication server, using non-aggregated communication over a single link, and the router further being accessible by a plurality of client devices onboard said moving vehicle;

providing at least one selection rule in said router for selecting whether to use aggregated or non-aggregated communication;

determining, upon a request from a client device to communicate with one of said remote servers, whether one of said at least one rules applies; and selecting to use aggregated communication via said aggregation server or non-aggregated communication via said at least one other communication server for communication based on said determination.

2. The method of claim 1, wherein the at least one selection rule comprises a dynamic adjustment to current load on the aggregation server.

3. The method of claim 2, wherein the load on the aggregation server is estimated based on information received by direct communication with the aggregation server or indirectly, based on router configurations.

4. The method of claim 1, wherein the at least one selection rule comprises determining whether a requested resource involves a HTTP communication, and if so to assign non-aggregated communication for this communication.

5. The method claim 1, wherein the at least one selection rule comprises determining whether a requested resource involves a TCP communication a destination port of 80, and if so to assign non-aggregated communication for this communication.

6. The method of claim 1, wherein the at least one selection rule comprises determining whether a requested resource involves a VPN communication, and is so to assign an aggregated communication for this communication.

7. The method of claim 1, wherein the at least one selection rule comprises determining a data stream type related to a requested resource, and assigning aggregated communication to data stream types of predetermined data stream types.

8. The method of claim 7, wherein the predetermined data stream types is at least one of voice-over-IP (VOIP) and VPN.

9. The method of claim 7, wherein the data stream type is determined based on deep packet inspection.

10. The method of claim 1, wherein the router is configured for receiving and transmitting wireless data to and from at least two stationary communication servers using non-aggregated communication, each over a single link, and wherein non-aggregated communication is assigned to said stationary communication server links based on a round-robin protocol.

11. The method of claim 1, wherein when it is determined that there is a high load on the aggregation server, communication normally assigned to aggregated communication is instead assigned to non-aggregated communication.

12. The method of claim 11, wherein the router is configured for receiving and transmitting wireless data to and from at least two stationary communication servers using non-aggregated communication, each over a single link, and wherein the communication normally assigned to aggregated communication is assigned to non-aggregated communication links having the best characteristics.

13. The method of claim 1, wherein the moving vehicle is a train.

14. The method of claim 1, wherein the aggregation server has a single, stable IP address, and wherein the virtual connection makes it appear to a third party as if all communication takes place between the third party and the aggregation server.

15. A wireless communication system for a moving vehicle, comprising:
at least one router in the moving vehicle for communication with remote servers through at least one external mobile network, wherein the router is configured for receiving and transmitting wireless data to and from both an aggregation server, using aggregated communication over at least two separate links, thereby forming a single virtual connection between the at least one router and the aggregation server, and at least one other stationary communication server, using non-aggregated communication over a single link, and the router further being accessible by a plurality of client devices onboard said moving vehicle;
a controller within or connected to said router, said controller including at least one selection rule for selecting whether to use aggregated or non-aggregated communication, the controller being configured to determine, upon a request from a client device to communicate with one of said remote servers, whether one of said at least one rules applies, and to select using aggregated communication via said aggregation server or non-aggregated communication via said at least one other communication server for communication based on said determination.

16. The wireless communication system of claim 15, wherein the router and the aggregation server are connected through a plurality of exterior mobile networks, which are simultaneously useable, and wherein the router is arranged to communicate with the aggregation server on at least two different communication routes having different characteristics, and to automatically separate the communication traffic between said communication routes based on specific optimization conditions.

* * * * *